(12) United States Patent
Murao et al.

(10) Patent No.: US 9,753,292 B2
(45) Date of Patent: Sep. 5, 2017

(54) STEREOSCOPIC DISPLAY DEVICE

(75) Inventors: Takehiro Murao, Osaka (JP); Takuto Yoshino, Osaka (JP); Hiroshi Fukushima, Osaka (JP); Tomoo Takatani, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 320 days.

(21) Appl. No.: 14/236,424

(22) PCT Filed: Jul. 27, 2012

(86) PCT No.: PCT/JP2012/069114
§ 371 (c)(1),
(2), (4) Date: Jan. 31, 2014

(87) PCT Pub. No.: WO2013/018681
PCT Pub. Date: Feb. 7, 2013

(65) Prior Publication Data
US 2014/0168548 A1    Jun. 19, 2014

(30) Foreign Application Priority Data
Aug. 3, 2011 (JP) ................................. 2011-170037

(51) Int. Cl.
*G02F 1/1335* (2006.01)
*G02B 27/22* (2006.01)
(Continued)

(52) U.S. Cl.
CPC ......... *G02B 27/2214* (2013.01); *G02B 27/22* (2013.01); *G02F 1/1347* (2013.01);
(Continued)

(58) Field of Classification Search
CPC .. G02B 27/2214; G02B 27/225; G02F 1/1347
See application file for complete search history.

(56) References Cited

U.S. PATENT DOCUMENTS 7,486,350 B2 * 2/2009 Yabuta .................. G02F 1/1323
349/104
2004/0222945 A1 11/2004 Taira et al.
(Continued)

FOREIGN PATENT DOCUMENTS

CN        102062977 A     5/2011
JP        2004-258631 A    9/2004
(Continued)

OTHER PUBLICATIONS

Official Communication issued in International Patent Application No. PCT/JP2012/069114, dated Sep. 4, 2012.

*Primary Examiner* — Paisley L Arendt
(74) *Attorney, Agent, or Firm* — Keating & Bennett, LLP

(57) ABSTRACT

Provide is a stereoscopic display device that is capable of, while preventing the crosstalk ratio from deteriorating, increasing the brightness during 3D display, switching 2D display and 3D display without decreases in the resolution, and achieving a switching response speed at the same level as that in the parallax barrier method. A switching liquid crystal panel (14) includes: a pair of substrates (28, 30); a liquid crystal layer (32) sealed between the substrates in pair (28, 30); a common electrode (38) formed over an entirety of an area where a parallax barrier (48) is realized on the substrate (30); and a plurality of drive electrodes (34) formed on the substrate (28), the drive electrodes (34), in collaboration with the common electrode (38), forming light-shielding parts (44) when a voltage is applied thereto, wherein the transmission parts (46) has an opening width that is equal to or greater than an opening width of the pixels (26) in a direction in which the transmission parts (46) and the light-shielding parts (44) are arrayed alternately.

7 Claims, 7 Drawing Sheets

(51) Int. Cl.
*H04N 13/04* (2006.01)
*G03B 35/24* (2006.01)
*G02F 1/1347* (2006.01)
*G02F 1/1343* (2006.01)

(52) U.S. Cl.
CPC ......... *G03B 35/24* (2013.01); *H04N 13/0409* (2013.01); *H04N 13/0454* (2013.01); *G02B 27/225* (2013.01); *G02F 2001/134318* (2013.01)

(56) References Cited

U.S. PATENT DOCUMENTS

| | | | |
|---|---|---|---|
| 2008/0266387 A1 | 10/2008 | Krijn et al. | |
| 2011/0304612 A1* | 12/2011 | Ohyama | G02F 1/1347 345/419 |
| 2012/0069276 A1* | 3/2012 | Ishikawa | G02B 27/2214 349/103 |

FOREIGN PATENT DOCUMENTS

| | | |
|---|---|---|
| JP | 2004-264760 A | 9/2004 |
| JP | 2005-258222 A | 9/2005 |
| JP | 2006-039226 A | 2/2006 |
| JP | 2009-520231 A | 5/2009 |
| JP | 2011-17825 A | 1/2011 |

* cited by examiner

STEREOSCOPIC DISPLAY DEVICE

TECHNICAL FIELD

The present invention relates to a stereoscopic display device including a switching liquid crystal panel.

BACKGROUND ART

As a method for allowing a viewer to view stereoscopic images without using special glasses, the parallax barrier method and the lenticular lens method have been known since before. For example, JP2004-264760A (Patent Document 1) discloses a stereoscopic video display device that includes a switching liquid crystal panel that is capable of realizing a parallax barrier in which openings for transmitting light and light-shielding parts for blocking light are arrayed alternately. In the parallax barrier method, however, though it is possible to switch 2D display and 3D display from one to the other without a decrease in the resolution during 2D display, brightness during 3D display is 50% or less as compared with that during 2D display, due to the left-right image separation necessary for stereoscopic display, which is achieved by blocking light with light-shielding parts.

On the other hand, in the lenticular lens method, since a lens sheet is attached over a display panel so that images are separated by the light condensing effect of the lenses, the brightness during 3D display at the same level or higher as compared with that during 2D display can be ensured. During 2D display, however, the resolution in the horizontal direction becomes 1/2 or less (the resolution becomes 1/N if the number of viewing points is N), since the light condensing effect is exhibited during 2D display as well.

In this way, both of the parallax barrier method and the lenticular lens method have advantages and disadvantages. As a method that attempts to improve these disadvantages, the liquid crystal lens method is available. For example, JP2004-258631A (Patent Document 2) and JP2009-520231T (Patent Document 3) disclose a stereoscopic display device in which a voltage is applied across a pair of substrates so that pseudo lenses are formed in a liquid crystal layer sealed between these substrates in pair. In the stereoscopic display device disclosed in Patent Documents 2 and 3, however, a desired lens effect could hardly be exhibited at boundary areas between adjacent two of the lenses, which causes the crosstalk ratio to deteriorate. Besides, since the image separation is performed only by light condensing by the liquid crystal lenses, it is necessary that the liquid crystal layer has to have a greater thickness in order to achieve a satisfactory light condensing effect, which causes a problem that the switching speed for the switching between 2D display and 3D display decreases. In addition to this, it is significantly difficult to keep the cell thickness uniform, which causes a problem of poor mass producibility.

DISCLOSURE OF INVENTION

It is an object of the present invention to provide a stereoscopic display device that is capable of, while preventing the crosstalk ratio from deteriorating, increasing the brightness during 3D display, switching 2D display and 3D display without decreases in the resolution, and achieving a switching response speed at the same level as that in the parallax barrier method.

A stereoscopic display device of the present invention includes: a display panel that has a plurality of pixels, and displays a synthetic image in which a right eye image and a left eye image that are divided in a stripe form are arrayed alternately; and a switching liquid crystal panel that is arranged on one side in the thickness direction of the display panel and is capable of realizing a parallax barrier in which transmission parts that transmit light and light-shielding parts that block light are arranged alternately. The switching liquid crystal panel includes: a pair of substrates; a liquid crystal layer sealed between the substrates in pair; a common electrode formed over an entirety of an area where the parallax barrier is realized, on one of the substrates; and a plurality of drive electrodes formed on the other of the substrates, the drive electrodes, in collaboration with the common electrode, forming the light-shielding parts when a voltage is applied thereto, wherein the transmission parts have an opening width that is equal to or greater than an opening width of the pixels in a direction in which the transmission parts and the light-shielding parts are arrayed alternately.

The stereoscopic display device of the present invention is capable of, while preventing the crosstalk ratio from deteriorating, increasing the brightness during 3D display, switching 2D display and 3D display without decreases in the resolution, and achieving a switching response speed at the same level as that in the parallax barrier method.

DESCRIPTION OF THE INVENTION

Figure 1:
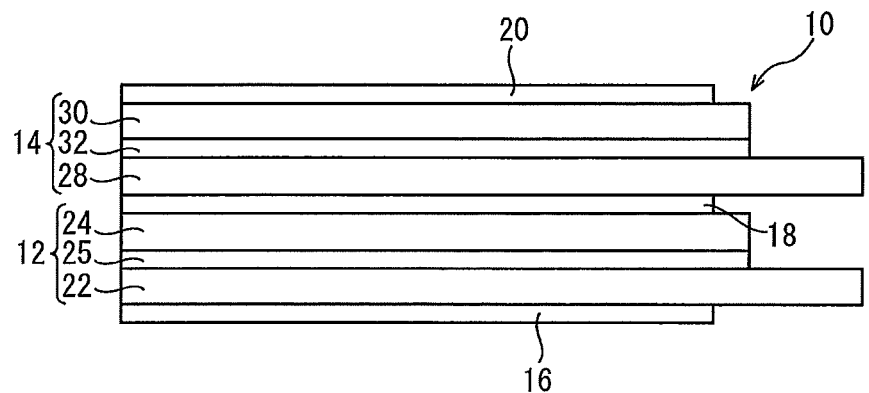
FIG. 1 schematically shows an exemplary schematic configuration of a stereoscopic display device as Embodiment 1 of the present invention.

A stereoscopic display device according to one embodiment of the present invention includes: a display panel that has a plurality of pixels, and displays a synthetic image in which a right eye image and a left eye image that are divided in a stripe form are arrayed alternately; and a switching liquid crystal panel that is arranged on one side in the thickness direction of the display panel and is capable of realizing a parallax barrier in which transmission parts that transmit light and light-shielding parts that block light are arranged alternately. The switching liquid crystal panel includes: a pair of substrates; a liquid crystal layer sealed between the substrates in pair; a common electrode formed over an entirety of an area where the parallax barrier is realized, on one of the substrates; and a plurality of drive electrodes formed on the other of the substrates, the drive electrodes, in collaboration with the common electrode, forming the light-shielding parts when a voltage is applied thereto, wherein the transmission parts have an opening width that is equal to or greater than an opening width of the pixels in a direction in which the transmission parts and the light-shielding parts are arrayed alternately (the first configuration).

In the first configuration, a left eye image and a right eye image can be separated by light-shielding parts, whereby the crosstalk ratio can be prevented from deteriorating, which is different from the liquid crystal lens method.

Further, the light condensing effect can be exhibited within the transmission part by setting the opening width of the transmission parts at a level equal to or greater than the opening width of the pixels in the direction in which the transmission parts and the light-shielding parts are arrayed alternately. As a result, the brightness increases.

Still further, since the thickness of the liquid crystal layer that is equal to the thickness in the parallax barrier method allows the light condensing effect to be exhibited, a response speed upon the switching between 2D display and 3D display does not become slower. The first configuration makes it possible to avoid the liquid crystal layer having an increased thickness.

It should be noted that the if the opening width of the transmission parts is smaller than the opening width of the pixels, the amount of light that can be condensed is insufficient, whereby a brightness of 50% or more for 2D display cannot be achieved. Therefore, the opening width of the transmission parts may be set greater than the opening width of the pixels, so that the amount of light that can be condensed increases, whereby the intended light condensing effect can be achieved.

Further, since the light condensing effect is not exhibited in a state where no parallax barrier is formed, the switching between 2D display and 3D display is enabled without any decrease in the resolution.

The second configuration is the first configuration modified so that the opening width of the transmission parts is equal to an interval of two adjacent ones of the pixels in the direction in which the transmission parts and the light-shielding parts are arrayed alternately. In such configuration, the light condensing effect of the transmission parts can be enhanced.

The third configuration is the first or second configuration modified so as to satisfy Formula (1) shown below:

$$S \leq P + (P-A) \tag{1}$$

where S represents the opening width of the transmission parts, A represents the opening width of the pixels, and P represents the interval of the pixels. When the opening of the transmission part exceeds the upper limit set according to Formula (1), satisfactory light-shielding with respect to light from adjacent pixels cannot be achieved, which results in that the crosstalk ratio deteriorates. However, in the case where the upper limit of the opening of the transmission part is set according to Formula (1), such inconveniences can be avoided, whereby the deterioration of crosstalk can be prevented.

The fourth configuration is any one of the first to third configurations modified so as to further include: an alignment film provided on one of the substrates, the substrate being positioned on the display panel side; and a polarizing plate arranged between the display panel and the switching liquid crystal panel, wherein an alignment axis of the alignment film is parallel with a transmission axis of the polarizing plate. In such a configuration, the light condensing effect of the transmission parts can be improved further.

The fifth configuration is any one of the first to fourth configurations modified so that an angle formed between a long axis of liquid crystal molecules positioned at the center in a thickness direction of the liquid crystal layer and a reference line extending in a lengthwise direction of the transmission parts is set in a range of 0° to 45°. In such a configuration, the deterioration of the crosstalk ratio can be suppressed further.

The sixth configuration is the fifth configuration modified so that the angle formed between the long axis and the reference line is 0°. In such a configuration, the deterioration of the crosstalk ratio can be suppressed still further.

The seventh configuration is any one of the first to sixth configurations modified so that the liquid crystal layer has a retardation set at a second minimum. In such a configuration, even further greater light condensing effect can be achieved, whereby a further greater effect of increasing the brightness is achieved.

The eighth configuration is any one of the fourth to seventh configurations modified so that a λ/2 plate is arranged between one of the substrates, positioned on the display panel side, and the polarizing plate. In such a configuration, the direction of oscillation of the light that enters the switching liquid crystal panel can be changed. As a result, a configuration with which the effect exhibited by the switching liquid crystal panel can be maximized, with the display viewing angle characteristics of the display panel being maintained.

Hereinafter, more specific embodiments of the present invention are explained with reference to the drawings. It should be noted that, for convenience of explanation, each drawing referred to hereinafter shows only principal members necessary for explanation of the present invention, in a simplified state, among the constituent members of the embodiments of the present invention. Therefore, the stereoscopic display device according to the present invention may include arbitrary constituent members that are not shown in the drawings referred to in the present specification. Further, the dimensions of the members shown in the drawings do not faithfully reflect actual dimensions of the constituent members, dimensional ratios of the constituent members, etc.

[Embodiment 1]

FIG. 1 shows a stereoscopic display device 10 as Embodiment 1 of the present invention. The stereoscopic display device 10 includes a display panel 12, a switching liquid crystal panel 14, and polarizing plates 16, 18, and 20.

The display panel 12 is a liquid crystal panel. The display panel 12 includes an active matrix substrate 22, a counter substrate 24, and a liquid crystal layer 25 sealed between these substrates 22 and 24. In the display panel 12, the liquid crystal is in an arbitrary operation mode.

Figure 2:
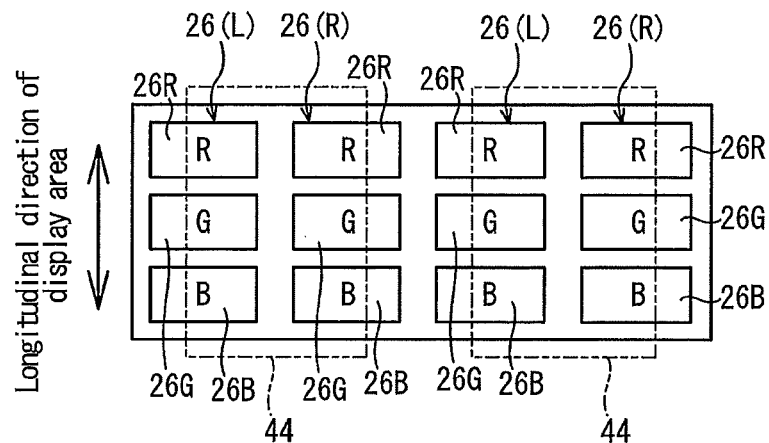
FIG. 2 is an explanatory view showing the relationship between the direction in which a plurality of subpixels are arrayed and the longitudinal direction of the display area (the lengthwise direction of light-shielding parts).
Figure 3:
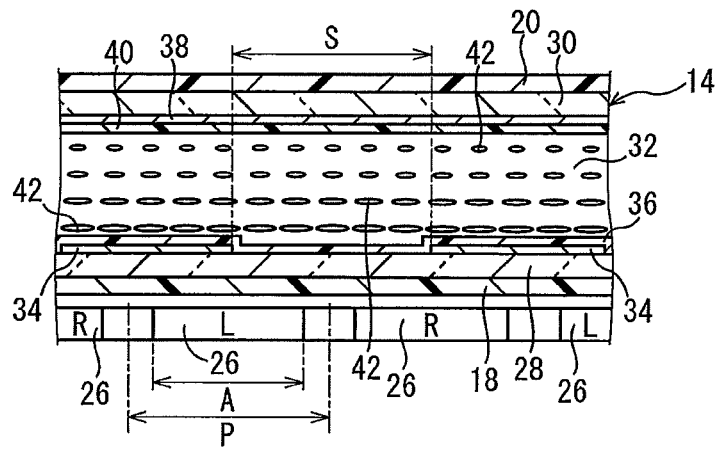
FIG. 3 is a cross-sectional view showing an exemplary schematic configuration of a switching liquid crystal panel provided in the stereoscopic display device shown in FIG. 1.

The display panel 12 includes a plurality of pixels 26, as shown in FIGS. 2 and 3. The plurality of pixels 26 are formed, for example, in matrix form. The area where the plurality of pixels 26 are formed is a display area of the display panel 12.

Each pixel 26 may include a plurality of subpixels 26R, 26G, and 26B, as shown in FIG. 2. In the example shown in FIG. 2, red pixels 26R, green pixels 26G and blue pixels 26B are used as the plurality of subpixels. In the example shown in FIG. 2, the plurality of subpixels 26R, 26G, and 26B are arrayed in the longitudinal direction of the display area of the display panel 12. It should be noted that the plurality of subpixels may further include yellow pixels.

In the display panel 12, as shown in FIGS. 2 and 3, rows of pixels 26 that display an image viewed by the right eye of a viewer (a right eye image), and rows of pixels 26 that display an image viewed by the left eye of the viewer (a left eye image) are alternately arranged in the lateral direction of the display panel 12. In other words, a right eye image and a left eye image are divided into pixel rows (into a stripe form). A synthetic image obtained by alternately arraying the portions of the right eye image and the portions of the left eye image thus obtained by dividing into a stripe form each is displayed in the display area of the display panel 12.

On the display panel 12, on one side thereof in the thickness direction, a switching liquid crystal panel 14 is arranged. As shown in FIG. 3, the switching liquid crystal panel 14 includes a pair of substrates 28, 30 and a liquid crystal layer 32.

The substrate 28, one of the pair, is, for example, a low-alkali glass substrate. On the substrate 28, a plurality of drive electrodes 34 are formed. The drive electrodes 34 are, for example, transparent conductive films such as indium tin oxide films (ITO films).

The drive electrodes 34 extend in the longitudinal direction of the substrate 28 (in the longitudinal direction of the display area of the display panel 12), in an approximately uniform width each. In other words, the plurality of drive electrodes 34 are arrayed in the lateral direction of the substrate 28 (in the lateral direction of the display area of the display panel 12).

The plurality of drive electrodes 34 are covered with an alignment film 36. The alignment film 36 is, for example, a polyimide resin film.

The other substrate 30 is, for example, a low-alkali glass substrate. On the substrate 30, a common electrode 38 is formed. The common electrode 38 is, for example, a transparent conductive film such as an indium tin oxide film (an ITO film).

The common electrode 38 overlaps all of the plurality of drive electrodes 34 in the direction in which the pair of substrates 28 and 30 face each other. The common electrode 38 is formed throughout an area where a parallax barrier 48 to be described later is realized, in the switching liquid crystal panel 14.

The common electrode 38 is covered with an alignment film 40. The alignment film 40 is, for example, a polyimide resin film.

The liquid crystal layer 32 is sealed between the pair of substrates 28 and 30. In the switching liquid crystal panel 14, the operation mode of the liquid crystal is the TN mode, and the retardation $\Delta n \cdot d$ of the liquid crystal is set at, for example, a second minimum. Here, "$\Delta n$" represents a refractive index anisotropy of liquid crystal, which is indicative of a difference between a refractive index along the long axis of the liquid crystal molecules and a refractive index along the short axis thereof. "d" represents a thickness of the liquid crystal layer 32.

Figure 4:
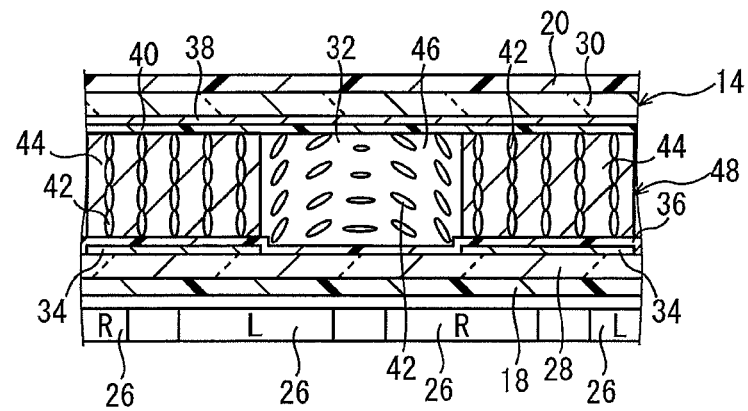
FIG. 4 is a cross-sectional view showing a state in which a parallax barrier is realized in the switching liquid crystal panel shown in FIG. 2.

In the switching liquid crystal panel 14, when a voltage is applied across the drive electrodes 34 and the common electrode 38, the orientations of the liquid crystal molecules 42 present between the drive electrodes 34 and the common electrode 38 change, as shown in FIG. 4. This causes portions of the liquid crystal layer 32, located between the drive electrodes 34 and the common electrode 38, to function as the light-shielding parts 44, and portions each of which is positioned adjacent between two of the light-shielding parts 44 function as the transmission parts 46. As a result, the parallax barrier 48 is realized in which the light-shielding parts 44 and the transmission parts 46 are arrayed alternately.

The method of applying voltages across the drive electrodes 34 and the common electrode 38 in order to realize the parallax barrier 48 in the switching liquid crystal panel 14 may be, for example, a method in which a voltage applied to the drive electrodes 34 and a voltage applied to the common electrode 38 have opposite phases to each other, or a method in which either the drive electrodes 34 or the common electrode 38 is grounded and a voltage is applied to the other. The voltage to be applied is, for example, a voltage of 5 V in a rectangular waveform.

In the stereoscopic display device 10, a synthetic image obtained by alternately arraying the portions of the right eye image and the portions of the left eye image obtained by dividing into a stripe form each is displayed in the display area of the display panel 12, in a state in which the parallax barrier 48 is realized in the switching liquid crystal panel 14. This allows only the right eye image to reach the right eye of a viewer, and allows only the left eye image to reach the left eye of the viewer. As a result, the viewer can view a stereoscopic image without using special glasses.

Further, in the stereoscopic display device 10, a planar image may be displayed on the display panel 12 in a state in which the parallax barrier 48 is not realized in the switching liquid crystal panel 14, so that the planar image can be shown to the viewer.

Here, in the switching liquid crystal panel 14, an opening width S of the transmission parts 46 shown in FIG. 3 (the dimension thereof in the direction in which the transmission parts 46 and the light-shielding parts 44 are arrayed alternately) satisfies Formula (1) shown below:

$$A \leq S \leq P + (P - A) \tag{1}$$

It should be noted that in Formula (1), "A" represents an opening width of the pixels 26 (the dimension thereof in the direction in which the transmission parts 46 and the light-shielding parts 44 are arrayed alternately), and "P" represents an interval of adjacent two of the pixels 26 that are adjacent in the direction in which the transmission parts 46 and the light-shielding parts 44 are arrayed alternately (pixel pitch) (see FIG. 3). Particularly in the present embodiment, in the case where each pixel 26 includes a plurality of subpixels 26R, 26G, and 26B, and these subpixels 26R, 26G, and 26B are arrayed in the longitudinal direction of the display area of the display panel 12 as shown in FIG. 2, "A" in Formula (1) is an opening width of the subpixels (the dimension thereof in the direction in which the transmission parts 46 and the light-shielding parts 44 are arrayed alternately).

If the opening width S of the transmission parts 46 is at or above the lower limit value indicated by Formula (1) (the opening width A of the pixels 26), pseudo lenses are formed in the transmission parts 46, as shown in FIG. 4. This allows the transmission parts 46 to exhibit the light condensing effect. As a result, the brightness increases.

If the opening width S of the transmission parts 46 exceeds the upper limit value indicated by Formula (1) (a value obtained by adding the pixel pitch P and a value obtained by subtracting the opening width A of the pixels 26 from this pixel pitch P), the transmission parts 46 hardly exhibit the light condensing effect.

If the opening width S of the transmission parts 46 exceeds the upper limit value indicated by Formula (1), light from the adjacent pixels 26 cannot be blocked sufficiently. This leads to the deterioration of the crosstalk ratio. Therefore, by setting the opening width S of the transmission parts 46 at or below the upper limit value indicated by Formula (1), the deterioration of the crosstalk ratio can be prevented.

Figure 5:
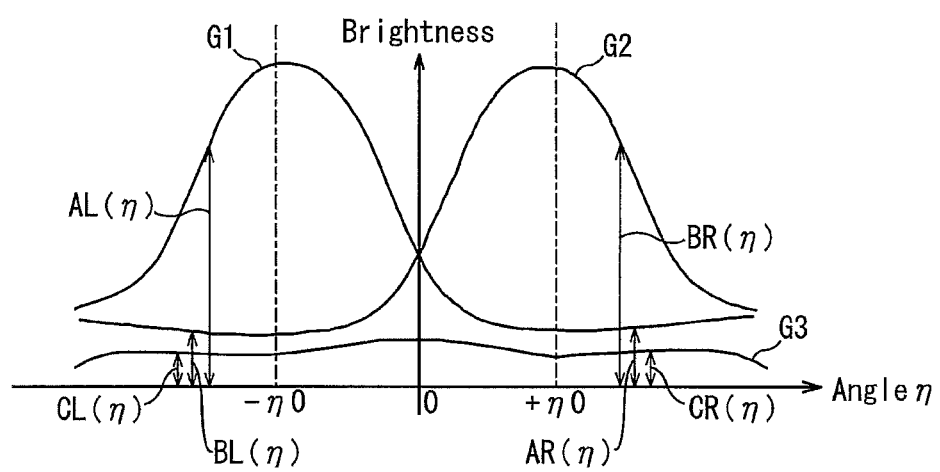
FIG. 5 is a graph showing the relationship between brightness and an angle η.

With regard to the stereoscopic display device 10 of the present embodiment, an experiment (Experiment 1) was carried out to examine the relationship between the opening width S of the transmission parts 46 and the brightness ratio. Here, the brightness ratio is, for example, a ratio between a brightness when the parallax barrier 48 is realized in the switching liquid crystal panel 14 (brightness during 3D display) and a brightness when the parallax barrier 48 is not realized in the switching liquid crystal panel (brightness during 2D display). The brightness during 3D display is a brightness in the case where a left eye image is displayed in black and a right eye image is displayed in white in a state in which the parallax barrier 48 is realized in the switching liquid crystal panel 14. The brightness during 2D display is a brightness in the case where white display is provided in the display area of the display panel 12 in a state in which the parallax barrier 48 is not realized in the switching liquid crystal panel 14. The brightness ratio is explained further in more detail below, with reference to FIG. 5. FIG. 5 shows a graph that shows the relationship between an angle η and brightness. The angle η is, for example, an angle of inclination to left or right with respect to a position of viewing the display panel 12 straightly in front of the same. In FIG. 5, the graph G1 shows the relationship between the brightness and the angle η in a state in which a right eye image is displayed in black and a left eye image is displayed in white. The graph G2 shows the relationship between the brightness and the angle η in a state in which a right eye image is displayed in white and a left eye image is displayed in black. The graph G3 shows the relationship between the brightness and the angle η in a state in which a right eye image and a left eye image are displayed in black. A naked eye stereoscopic display device has a position (eye point) optimal for viewing a stereoscopic display. Though the angle varies with a designed visibility distance, the eye point of the left eye is at such a position that the brightness is maximized in the graph G1, and the angle herein is −η0. The eye point of the right eye is at such a position that the brightness is maximized in the graph G2, and the angle herein is +η0. Hereinafter, the "brightness ratio" refers to a brightness ratio at the eye point.

In Experiment 1, the transmission parts 46 had an opening width S of 96 μm. The light-shielding part 44 had a width (a dimension thereof in the direction in which the transmission parts 46 and the light-shielding parts 44 are arrayed alternately) of 95.711 μm. The liquid crystal layer 32 had a thickness of 6.5 μm. The pixel pitch P was 96 μm. The pixels 26 had an opening width A of 61.75 μm. The liquid crystal had Δn of 0.175. It should be noted that Δn of the liquid crystal was set at a second minimum in the case where the liquid crystal layer 32 had a thickness d of 6.5 μm.

Figure 6:
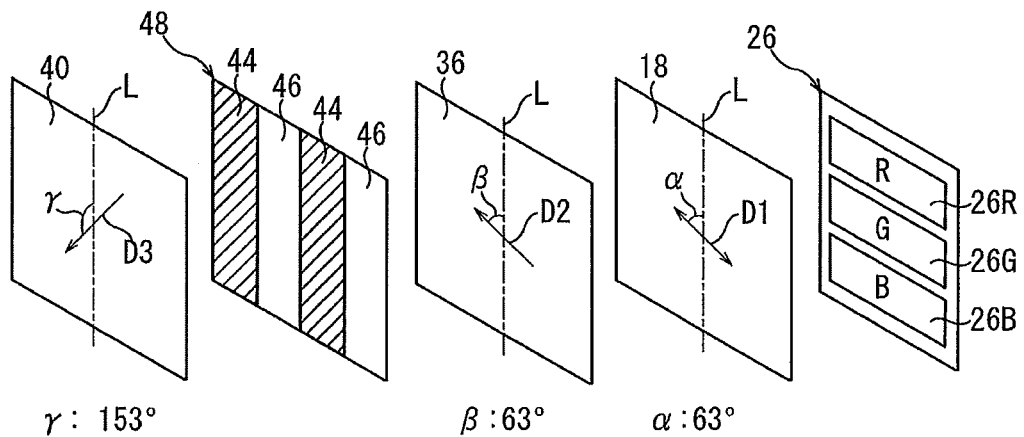
FIG. 6 is an explanatory view showing the relationship between an absorption axis of a polarizing plate and an alignment axis of an alignment film.

Experiment 1 was carried out with regard to a case where the absorption axis D1 of the polarizing plate 18 arranged between the display panel 12 and the switching liquid crystal panel 14 and the alignment axis D2 of the alignment film 36 are parallel with each other, as shown in FIG. 6 (Example 1). In Example 1, an angle α formed by the absorption axis D1 with respect to the reference line L that extends in the longitudinal direction of the display area of display panel 12 was 63°. An angle β formed by the alignment axis D2 with respect to the reference line L was 63°. An angle γ formed by the alignment axis D3 of the alignment film 40 with respect to the reference line L was 153°.

Figure 7:
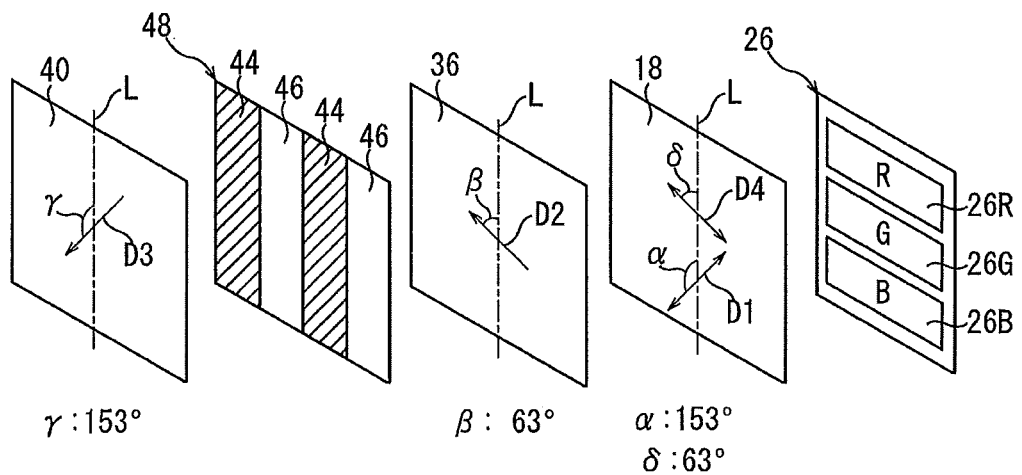
FIG. 7 is an explanatory view showing the relationship between a transmission axis of a polarizing plate and an alignment axis of an alignment film.

Experiment 1 was carried out with regard to a case where the absorption axis D1 of the polarizing plate 18 and the alignment axis D2 of the alignment film 36 are parallel with each other, as shown in FIG. 7 (Example 2). In Example 2, an angle α formed by the absorption axis D1 with respect to the reference line L was 153°. In other words, in Example 2, the angle δ formed by the transmission axis D4 of the polarizing plate 18 with respect to the reference line L was 63°. Further, the angle formed the alignment axis D2 with respect to the reference line L was 63°. As is clear from this, in Example 2, the transmission axis D4 of the polarizing plate 18 and the alignment axis D2 of the alignment film 36 are parallel with each other. Further, the angle γ formed by the alignment axis D3 of the alignment film 40 with respect to the reference line L was 153°.

Figure 8:
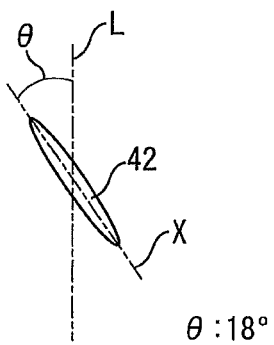
FIG. 8 is an explanatory view showing the relationship between a long axis of liquid crystal molecules and a reference line.

Experiment 1 was carried out with regard to a case where an angle θ formed between the long axis X of the liquid crystal molecules 42 positioned at the center in the thickness direction of the liquid crystal layer 32 and the reference line L was 18°, as shown in FIG. 8. This angle is an angle when no voltage is applied across the drive electrodes 34 and the common electrode 38.

In Experiment 1, the range of the opening width S of the transmission parts 46 set according to Formula (1) is as follows:

$$61.75 \leq S \leq 130.25$$

Figure 9:
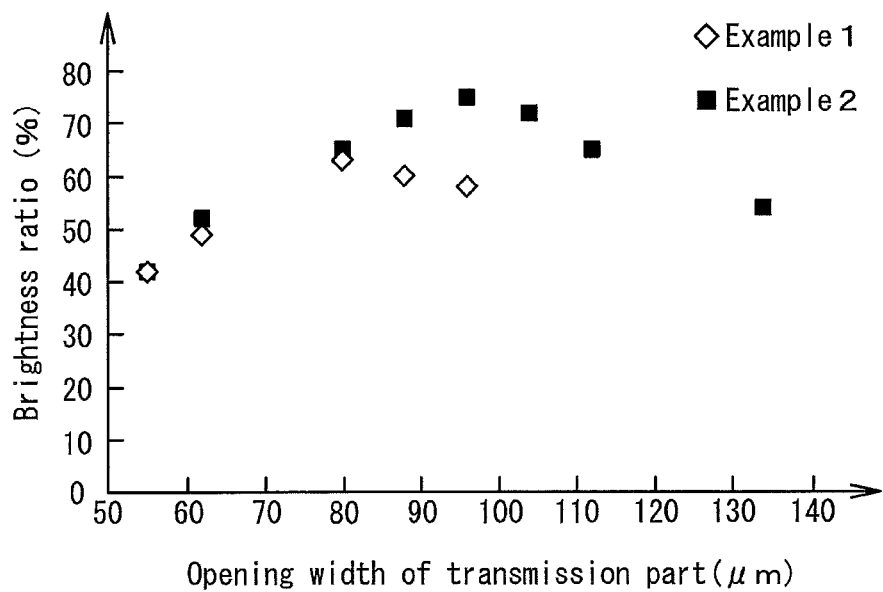
FIG. 9 is a graph showing the relationship between an opening width of transmission parts and a brightness ratio.

The results of Experiment 1 are shown in Table 1 and FIG. 9.

TABLE 1

| | Opening width of transmission parts (μm) | | | | | | | |
|---|---|---|---|---|---|---|---|---|
| | 55 | 62 | 80 | 88 | 96 | 104 | 112 | 134 |
| Brightness ratio of Example 1 (%) | 42 | 49 | 63 | 60 | 58 | — | — | — |
| Brightness ratio of Example 2 (%) | 42 | 52 | 65 | 71 | 75 | 72 | 65 | 54 |

As is clear from Table 1 and FIG. 9, in Experiment 1, the brightness ratio in the case where the opening width S of the transmission parts 46 is 55 μm is lower than in the other cases. Therefore, the opening width S of the transmission parts 46 may be set according to Formula (1), so that the improvement of the brightness can be achieved.

With regard to the stereoscopic display device 10 of the present embodiment, an experiment (Experiment 2) was carried out to examine the relationship between the opening width S of the transmission parts 46 and the crosstalk ratio. Here, the crosstalk ratio indicates to what extent the level of black display increases with respect to background components (both are displayed in black), for example, when either the pixels 26 for the left eye image or the pixels 26 for the right eye image are caused to perform white display and the others are caused to perform black display in a state where the parallax barrier 48 is realize in the switching liquid crystal panel 14. This is an index that indicates to what extent either the right eye image or the left eye image is viewed on the other. Here, the crosstalk ratio is defined according to the formulae (2) and (3) shown below:

$$LXT = \{(BL(\eta) - CL(\eta))/(AL(\eta) - CL(\eta))\} * 100 \quad (2)$$

$$RXT = \{(AR(\eta) - CR(\eta))/(BR(\eta) - CR(\eta))\} * 100 \quad (3)$$

Figure 10:
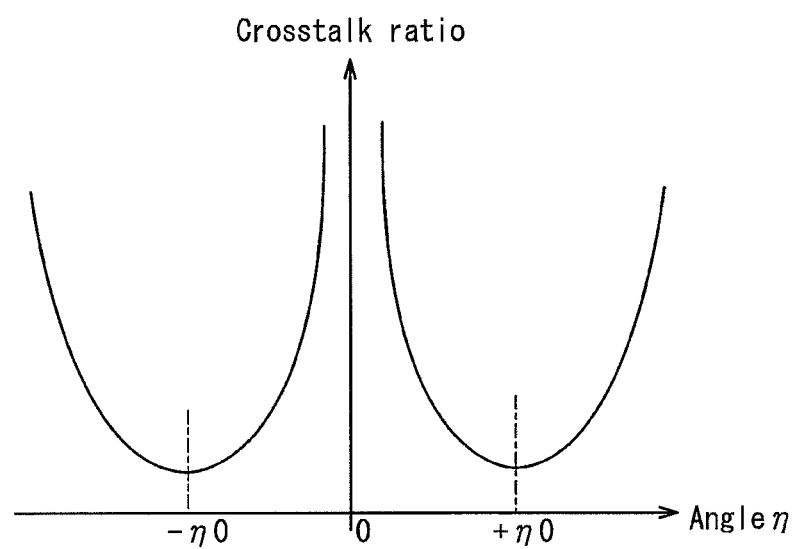
FIG. 10 is a graph showing the relationship between a crosstalk ratio and an angle η.

In the formulae, LXT represents a crosstalk ratio for the left eye; RXT represents a crosstalk ratio for the right eye; and $\eta$ represents the above-described angle $\eta$. As shown in FIG. 5, $AL(\eta)$ represents a brightness of an image viewed by the left eye in the graph G1, $AR(\eta)$ represents a brightness of an image viewed by the right eye in the graph G1, $BL(\eta)$ represents a brightness of an image viewed by the left eye in the graph G2, $BR(\eta)$ represents a brightness of an image viewed by the right eye in the graph G2, $CL(\eta)$ represents a brightness of an image viewed by the left eye in the graph G3, and $CR(\eta)$ represents a brightness of an image viewed by the right eye in the graph G3. The crosstalk ratio determined by Formulae (2) and (3) described above becomes minimum at the eye points (angle $\eta = +\eta 0$ and $\eta = -\eta 0$), as shown in FIG. 10. Hereinafter, the crosstalk ratio refers to a crosstalk ratio at the eye points. Generally, as the crosstalk ratio is lower, more excellent 3D display can be obtained, and influences to human bodies can be reduced. The experiment conditions of Experiment 2 are the same as those of Experiment 1. The results of Experiment 2 are shown in Table 2 and FIG. 11.

TABLE 2

| | Opening width of transmission parts (μm) | | | | | | | |
|---|---|---|---|---|---|---|---|---|
| | 55 | 62 | 80 | 88 | 96 | 104 | 112 | 134 |
| Crosstalk ratio of Example 1 (%) | 0.2 | 0.3 | 0.3 | 0.3 | 0.3 | — | — | — |
| Crosstalk ratio of Example 2 (%) | 0.2 | 0.3 | 0.3 | 0.3 | 0.3 | 0.4 | 0.5 | 0.8 |

Figure 11:
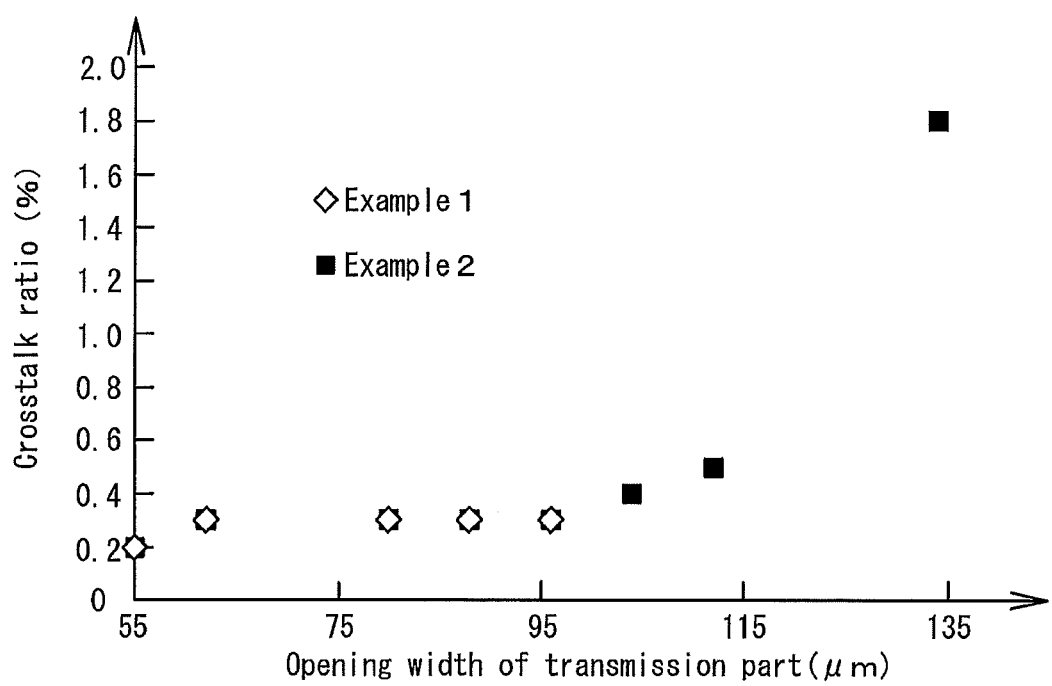
FIG. 11 is a graph showing the relationship between an opening width of transmission parts and a crosstalk ratio.

As is clear from Table 2 and FIG. 11, in Experiment 2, the crosstalk ratio in the case where the opening width S of the transmission parts 46 is 134 μm is significantly worse than in the other cases. Therefore, the opening width S of the transmission parts 46 may be set according to Formula (1), so that the deterioration of the crosstalk ratio can be prevented.

Further, in the stereoscopic display device 10, it is desirable that the transmission axis D4 of the polarizing plate 18 and the alignment axis D2 of the alignment film 36 are parallel, as shown in FIG. 7. An experiment (Experiment 3) was carried out to examine the brightness ratio in the case where the transmission axis D4 of the polarizing plate 18 and the alignment axis D2 of the alignment film 36 are parallel (Example), and the brightness ratio in the case where the absorption axis D1 of the polarizing plate 18 and the alignment axis D2 of the alignment film 36 are parallel (Comparative Example). In Experiment 3, the opening width S of the transmission parts 46 was set at 96 μm. Experiment 3 was carried out with regard to the cases where the angle θ formed between the long axis X of the liquid crystal molecules 42 positioned at the center in the thickness direction of the liquid crystal layer 32 and the reference line L was 0°, 18°, 72° and 90°. These angles were angles when no voltage was applied across the drive electrodes 34 and the common electrode 38. The results of Experiment 3 are shown in Table 3 and FIG. 12.

TABLE 3

| Angle θ (°) | 0 | 18 | 72 | 90 |
|---|---|---|---|---|
| Brightness ratio of Example (%) | 76 | 75 | 75 | 76 |
| Brightness ratio of Comparative Example (%) | 58 | 58 | 57 | 56 |

Figure 12:
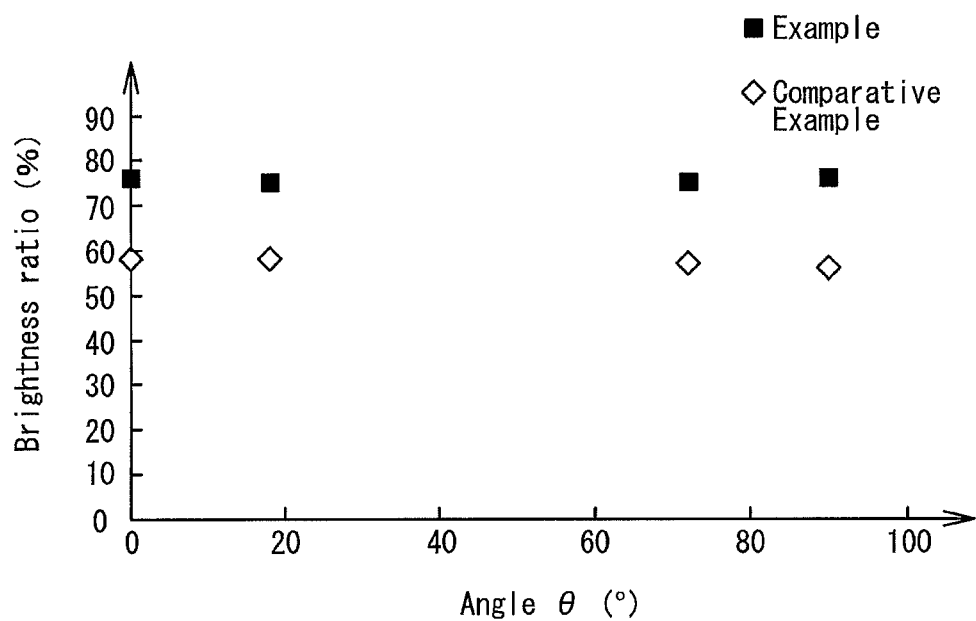
FIG. 12 is a graph showing the relationship between an orientation of a long axis of liquid crystal molecules and a brightness ratio.

As is clear from Table 3 and FIG. 12, the brightness ratio in Example was improved as compared with Comparative Example, irrespective of the orientation of the long axis X, which is the effect of the high brightness. Further, it is also clear from FIG. 9 that in the case where the transmission axis D4 of the polarizing plate 18 and the alignment axis D2 of the alignment film 36 were parallel with each other, the brightness ratio was improved as compared with the case where the absorption axis D1 of the polarizing plate 18 and the alignment axis D2 of the alignment film 36 were parallel with each other.

Besides, an experiment (Experiment 4) was carried out to examine the crosstalk ratio in the case where the transmission axis D4 of the polarizing plate 18 and the alignment axis D2 of the alignment film 36 are parallel with each other (Example), and the crosstalk ratio in the case where the absorption axis D1 of the polarizing plate 18 and the alignment axis D2 of the alignment film 36 are parallel with each other (Comparative Example). Experiment conditions of Experiment 4 were the same as the experiment conditions of Experiment 3. The experiment results of Experiment 4 are shown in Table 4 and FIG. 13.

TABLE 4

| Angle θ (°) | 0 | 18 | 72 | 90 |
|---|---|---|---|---|
| Crosstalk ratio of Example (%) | 0.2 | 0.3 | 0.8 | 1.1 |
| Crosstalk ratio of Comparative Example (%) | 0.2 | 0.3 | 1.1 | 1.3 |

Figure 13:
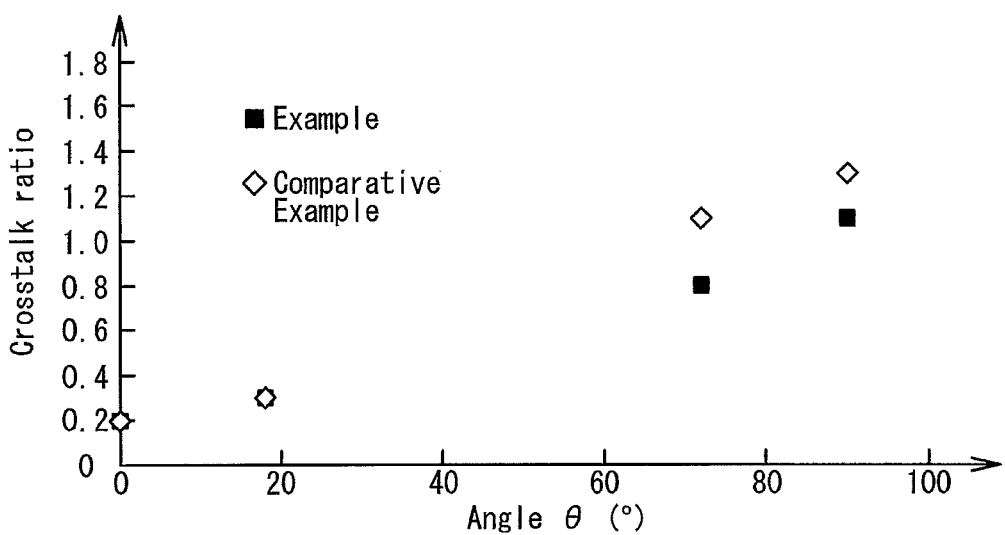
FIG. 13 is a graph showing the relationship between an orientation of a long axis of liquid crystal molecules and a crosstalk ratio.

As is clear from Table 3, Table 4, FIG. 12 and FIG. 13, the transmission axis D4 of the polarizing plate 18 and the alignment axis D2 of the alignment film 36 may be set to be parallel with each other, and the long axis X may be set to be nearly parallel with the reference line L, so that the brightness can be increased while the deterioration of the crosstalk ratio is suppressed.

Further, in the stereoscopic display device 10, as is clear from Table 4 and FIG. 13, the crosstalk ratio deteriorates as the angle θ formed between the long axis X of the liquid crystal molecule 42 and the reference line L increases. The cause of this is that in the switching liquid crystal panel 14, the operation mode of the liquid crystal is the TN mode. In other words, in the case where the operation mode of the liquid crystal is the TN mode, the barrier contrast decreases, due to influences of the viewing angle characteristics. Therefore, the angle θ formed between the long axis X of the liquid crystal molecules 42 and the reference line L is desirably smaller. For example, the angle θ formed between the long axis X of the liquid crystal molecules 42 and the reference line L is desirably 45° or smaller. As is clear from Table 4 and FIG. 13, the most preferable angle θ is 0°.

Further, in the stereoscopic display device 10, it is unnecessary to increase the thickness of the liquid crystal layer 32 of the switching liquid crystal panel 14 in order to achieve the lens effect as in the conventional liquid crystal lens method. Therefore, a decrease in the response speed of the liquid crystal can be avoided.

[Application Example of Embodiment 1]

Figure 14:
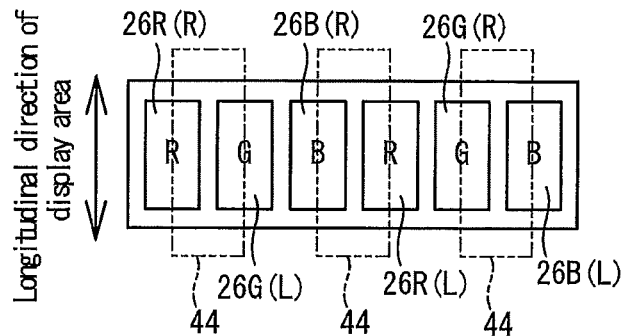
FIG. 14 is an explanatory view showing the relationship between the direction in which a plurality of subpixels are arrayed and the longitudinal direction of a display area (the lengthwise direction of light-shielding parts) in an application example of Embodiment 1.

Though Embodiment 1 has a configuration in which a plurality of subpixels 26R, 26G, and 26B are arrayed in the longitudinal direction of the display area of the display panel 12, the present application example has a configuration in which a plurality of subpixels 26R, 26G, and 26B are arrayed in the lateral direction of the display area of the display panel 12, as shown in FIG. 14. In this case, as shown in FIG. 14, the subpixels contributing to the display of a left eye image and the subpixels contributing to the display of a right eye image are arrayed alternately in the lateral direction of the display area of the display panel 12. In the present application example, "A" in Formula (1) described in the explanation of Embodiment 1 represents the opening width of the subpixels (the dimension thereof in the direction in which the transmission parts 46 and the light-shielding parts 44 are arrayed alternately), and "P" represents the interval of adjacent two of the subpixels in the direction in which the transmission parts 46 and the light-shielding parts 44 are arrayed alternately (an array pitch of the subpixels).

[Embodiment 2]

Figure 15:
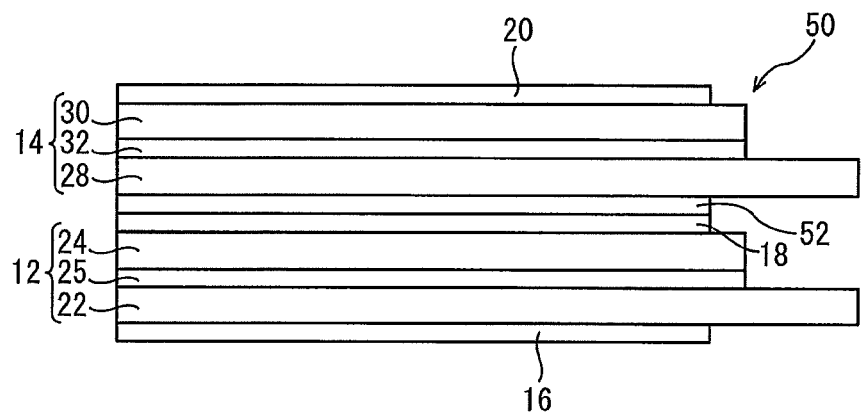
FIG. 15 schematically shows an exemplary schematic configuration of a stereoscopic display device as Embodiment 2 of the present invention.

A stereoscopic display device 50 as Embodiment 2 of the present invention is explained with reference to FIG. 15. The stereoscopic display device 50 of the present embodiment is different from the stereoscopic display device 10 of Embodiment 1 in that a λ/2 plate 52 is arranged between the polarizing plate 18 and the switching liquid crystal panel 14.

Figure 16:
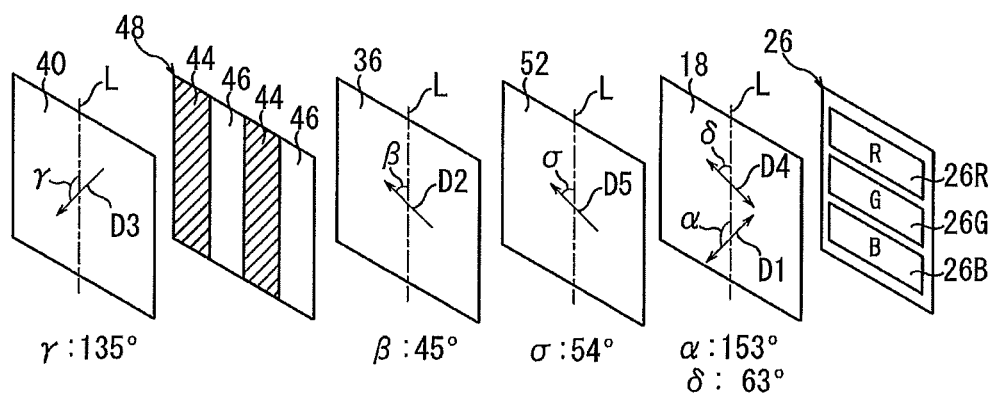
FIG. 16 is an explanatory view showing the relationship among a transmission axis of a polarizing plate, an alignment axis of an alignment film, and a slow axis of a λ/2 plate.

In the present embodiment, as shown in FIG. 16, an angle δ formed between the transmission axis D4 of the polarizing plate 18 and the reference line L is 63°. The reason why the angle δ is 63° is that the display panel 12 is a liquid crystal panel of the ASV type (in which the operation mode of the liquid crystal is the VA mode and the CPA type). In the liquid crystal panel of the ASV type, preferable viewing angle characteristics are obtained when the angle δ is 63°. The angle o formed between the slow axis D5 of the λ/2 plate 52 and the reference line L is 54°. The angle β formed between the alignment axis D2 of the alignment film 36 and the reference line L is 45°.

The λ/2 plate 52 changes the direction of oscillation of light that enters the switching liquid crystal panel 14, from the direction of transmission axis D4 of the polarizing plate 18 to the direction of the alignment axis D2 of the alignment film 36. This makes it possible to ensure the light condensing effect of the transmission parts 46 and prevent the crosstalk ratio from deteriorating, while maintaining the viewing angle characteristics of the display panel 12. It should be noted that the effect of ensuring the light condensing effect of the transmission parts 46 and at the same time preventing the crosstalk ratio from deteriorating is clear from the experiment results in the case where the angle θ formed between the long axis X of the liquid crystal molecules 42 and the reference line L was 0°, shown in Tables 3 and 4.

So far embodiments of the present invention have been described in detail, but they are merely examples and do not limit the present invention at all.

For example, in the foregoing embodiments, the display panel 12 may be a plasma display panel, an organic EL (Electro Luminescence) panel, an inorganic ET, panel, or the like.

The invention claimed is:

1. A stereoscopic display device comprising:
a display panel including a plurality of pixels, and that displays an image in which a right eye image and a left eye image that are divided in a stripe form are arrayed alternately;
a polarizing plate outside the display panel;
a switching liquid crystal panel that generates a parallax barrier in which transmission portions that transmit light and light-shielding portions that block light are arranged alternately, the switching liquid crystal panel located outside the display panel such that the switching liquid crystal panel and the display panel sandwich the polarizing plate,
wherein the switching liquid crystal panel includes:
a pair of substrates;
a liquid crystal layer sealed between the pair of substrates;
a common electrode over an entirety of an area where the parallax barrier is generated, on one of the pair of substrates;
a plurality of drive electrodes on the other of the pair of substrates, the drive electrodes, in collaboration with the common electrode, forming the light-shielding portions when a voltage is applied thereto; and
an alignment film on one of the pair of substrates on a display panel side;
wherein
the transmission portions include an opening width that is equal to or greater than an opening width of the plurality of pixels in a direction in which the transmission portions and the light-shielding portions are arrayed alternately,
an alignment axis of the alignment film is parallel with a transmission axis of the polarizing plate,
an angle defined between a long axis of liquid crystal molecules positioned at a center in a thickness direction of the liquid crystal layer and a reference line extending in a lengthwise direction of the transmission portions, when observed from the thickness direction of the liquid crystal layer without any voltage across the drive electrodes and the common electrode, is in a range of 0° to 45°, and
an operation mode of the liquid crystal layer is a twisted nematic mode.

2. The stereoscopic display device according to claim 1, wherein the opening width of the transmission portions is equal to an interval of two adjacent ones of the plurality of pixels in a direction in which the transmission portions and the light-shielding portions are arrayed alternately.

3. The stereoscopic display device according to claim 1, satisfying Formula (1) shown below:

$$S \leq P + (P - A) \quad \quad (1)$$

where S represents the opening width of the transmission portions, A represents the opening width of the plurality of pixels, and P represents an interval of the pixels.

4. The stereoscopic display device according to claim 1, wherein the liquid crystal layer has a retardation set at a second minimum.

5. The stereoscopic display device according to claim 1, wherein a λ/2 plate is arranged between one of the substrates, positioned on the display panel side, and the polarizing plate.

6. The stereoscopic display device according to claim 1, wherein the angle formed between the long axis and the reference line is between 0° and 18°, inclusive.

7. The stereoscopic display device according to claim 6, wherein the angle formed between the long axis and the reference line is 0°.

* * * * *